(12) United States Patent
Nikitin et al.

(10) Patent No.: US 8,564,412 B2
(45) Date of Patent: Oct. 22, 2013

(54) METHOD AND APPARATUS TO ESTIMATE THE NUMBER OF TRANSPONDERS IN A FIELD

(75) Inventors: Pavel Nikitin, Seattle, WA (US); Venkata S. Kodukula, Bothell, WA (US)

(73) Assignee: Intermec IP Corp., Everett, WA (US)

( * ) Notice: Subject to any disclaimer, the term of this patent is extended or adjusted under 35 U.S.C. 154(b) by 502 days.

(21) Appl. No.: 12/958,991

(22) Filed: Dec. 2, 2010

(65) Prior Publication Data

US 2012/0139711 A1    Jun. 7, 2012

(51) Int. Cl.
*H04Q 5/22* (2006.01)
(52) U.S. Cl.
USPC ................... 340/10.32; 340/10.33
(58) Field of Classification Search
USPC .......................... 340/10.32, 10.33
See application file for complete search history.

(56) References Cited

U.S. PATENT DOCUMENTS

| 7,535,360 B2 | 5/2009 | Barink et al. |
| 7,773,945 B2 | 8/2010 | Reynolds |
| 2005/0280505 A1 | 12/2005 | Humes et al. |
| 2010/0060423 A1 | 3/2010 | Pillai |

FOREIGN PATENT DOCUMENTS

| WO | 03/049275 A1 | 6/2003 |
| WO | 2009/025425 A1 | 2/2009 |

OTHER PUBLICATIONS

Bae et al., "Study on the Demodulation Structure of Reader Receiver in a Passive RFID Environment," Progress in Electromagnetics Research, PIER 91:243-258, 2009.
Bang et al., "Identification of RFID Tags in Dynamic Framed Slotted ALOHA," 11th International Conference on Advanced Communication Technology, Phoenix Park, South Korea, Feb. 15-18, 2009, pp. 354-357.
Bhardwaj, "Dynamic 'Q' Inventory Algorithm for RFID Tag Identification," Centre for Development of Advanced Computing, Annual Seminar on CDAC, Noida Technologies (ASCNT-2010), Mar. 11-12, 2010, 16 pages.
Fan et al., "Gen2-based Hybrid Tag Anti-collision Q Algorithm using Chebyshev's Inequality for Passive RFID Systems," IEEE 19th International Symposium on Personal, Indoor and Mobile Radio Communications, Cannes, France, Sep. 15-18, 2008, 5 pages.
Maguire et al., "An Optimal Q-Algorithm for the ISO 18000-6C RFID Protocol," IEEE Transactions on Automation Science and Engineering 6(1):16-24, 2009.

(Continued)

*Primary Examiner* — Daniel Wu
*Assistant Examiner* — Frederick Ott
(74) *Attorney, Agent, or Firm* — Seed IP Law Group PLLC

(57) ABSTRACT

A total number of transponders in an interrogation field is estimated or determined based on demodulated baseband direct and quadrature components from a plurality of collided responses from multiple transponders, including collided responses from which information encoded therein cannot be recovered, and would conventionally be discarded. A query or Q value may be set without an a priori knowledge of the actual number or even approximate number of transponders in the field of the interrogator or reader. Such may allow transponders to be quickly and efficiently singulated, for example in a single pass, and information read from and/or written to singulated transponders.

21 Claims, 4 Drawing Sheets

(56) References Cited

OTHER PUBLICATIONS

Pillai et al., "A Technique for Simultaneous Multiple Tag Identification," Fourth IEEE Workshop on Automatic Identification Advanced Technologies, Oct. 17-18, 2005, 4 pages.

Schreyogg, "Identification of Voiceband Data Signal Constellations Using a Divisive Cluster Algorithm," Proceedings of the 1996 IEEE Digital Signal Processing Workshop, Loen, Norway, Sep. 1-4, 1996, pp. 474-477.

Swami et al., "Modulation Classification via Hierarchical Agglomerative Cluster Analysis," First IEEE Signal Processing Workshop on Signal Processing Advances in Wireless Communications, Paris, France, Apr. 16-18, 1997, pp. 141-144.

Examine the Effects of Phase Noise on RFID Range, URL=http://mwrf.com/Article/ArticleID/19384/19384.html, download date Oct. 29, 2010.

Slotted Aloha, URL=http://www.cs.umd.edu/~shankar/417-F01/Slides/chapter5a-aus/sld021.htm, Slides 21-23, download date Oct. 15, 2010.

Slotted Aloha—Aloha Protocol, URL=http://www.laynetworks.com/slotted%20aloha.htm, download date Oct. 15, 2010.

"Slotted Aloha Multiaccess Protocol," CSE 390 Class Notes, Mar. 12, 2003, 2 pages.

Raubiszko, "A True In-Phase and Quadrature Demodulator Without the Use of a Directional Coupler Used in RFID Systems," Australian Provisional Application No. PR 9237, filed Dec. 3, 2001, 7 pages.

METHOD AND APPARATUS TO ESTIMATE THE NUMBER OF TRANSPONDERS IN A FIELD

TECHNICAL FIELD

This disclosure generally relates to estimating the number of transponders, for example radio frequency identification (RFID) transponders, in a crowded field of transponders, useful for instance in performing automatic data collection (ADC).

BACKGROUND INFORMATION

The ADC field includes a variety of different types of ADC data carriers and ADC readers operable to read data encoded in such data carriers. For example, machine-readable symbols readers may be used to read information encoded in the optical pattern of machine-readable symbols, such as one- or two-dimensional symbols (e.g., barcode symbols). Wireless radio or microwave frequency interrogators, for example RFID readers, may be used to read information from and/or write information to transponders, for example RFID transponders, commonly referred to as RFID tags.

RFID transponders or tags may store data in a wirelessly accessible memory, and may include a discrete power source (i.e., an active RFID tag), or may rely on power derived from an interrogation signal (i.e., a passive RFID tag). RFID readers typically emit a wireless interrogation or inquiry signal that causes the RFID transponder to respond with a return wireless signal encoding the data stored in the memory. The wireless signals typically have wavelengths falling in the radio or microwave portions of the electromagnetic spectrum. Whether radio or microwave frequencies are employed, such signals are commonly referred to as RF signals. Such a convention is adopted herein and throughout the attached claims.

Identification of an RFID transponder or tag generally depends on RF energy produced by a reader or interrogator arriving at the RFID transponder and returning to the reader. Multiple protocols exist for use with RFID transponders. These protocols may specify, among other things, particular frequency ranges, frequency channels, modulation schemes, security schemes, and/or data formats.

RFID transponders typically include a semiconductor device (e.g., a chip) and one or more conductive traces that form an antenna. The semiconductor device includes an integrated circuit that typically includes memory, logic circuitry and power circuitry. Typically, RFID transponders provide information stored in the memory in response to the RF interrogation signal received at the antenna from the interrogator or reader. Some RFID transponders include security measures, such as passwords and/or encryption. Many RFID transponders also permit information to be written or stored in the memory via an RF signal.

In many environments there may be multiple transponders within range or in the field of an interrogator or reader. Where transponders identifiers are not known beforehand, responses to interrogation signals from the various transponders may collide, making it difficult or even impossible to recover information encoded in the responses. To address such, many interrogation systems employ various methods to singulate transponders.

A common approach to singulation employs the Q-algorithm specified under the Gen2 protocol. The Q-algorithm is similar to slotted Aloha algorithm. In particular, under the Q-algorithm the interrogator or reader determines a value for a query or Q-value, and wirelessly instructions all transponders to respectively randomly generate two numbers, a first number and a second number. For example, the first number is randomly generated to have a value between 0 and $2^{Q-1}$ and is used to set a counter in the transponder. The second number is randomly generated to have, for example, a value between 0 and $2^{16}$. The interrogator or reader then transmits a signal that instructs each transponder to decrement the counter by one, and to respond to the interrogation or inquiry only if the resulting value of the transponder's respective counter is zero. If no transponders respond, the interrogator or reader transmits a signal instructing all transponders to decrement their respective counters. If two or more transponders respond, the interrogator or reader transmits a signal instructing the responding transponders to wait for a next cycle, while instructing the other non-responding transponders to decrement their counters. If only one transponder responds, the interrogator or reader sends a signal instructing the responding transponder to transmit the second number. The interrogator or reader acknowledges receipt of the response signal encoding the second number, and causes the responding transponder to temporarily stop responding (i.e., nap) to interrogations or inquiries.

Current approaches to selecting the value for query or Q-value are typically "blind" adaptive approaches, such as those described in Maguire, Y., Pappu, R., *An Optimal Q-Algorithm For The ISO 1800-6C RFID Protocol*, IEEE Transactions on Automation Science and Engineering, Vol. 6, Issue 1, January 2009, pages 16-24; and U.S. patent application publication Serial No. 2005-0280505. Such approaches make an initial guess at setting the value of the query or Q-value, then refine the value of Q over repeated cycles. Readers cannot decode and hence discard collided responses where two or more transponders respond concurrently. Conventional understanding is that such collisions or superposition of responses is useless. Under conventional approaches collisions require another round of communications, and hence lost time. Such is a particular detriment to successful interrogation of a crowded field.

New approaches for rapidly and accurately estimating or determining the total number of transponders in a field are desirable.

BRIEF SUMMARY

In contrast to conventional approaches which discard a response if unable to decode such, for example if the response of two or more transponders have collided, the approaches described herein are able to use such collided responses to estimate or determine the number of transponders in a field, even a crowded field. In contrast to conventional approaches which attempt to avoid collisions, the approaches described herein attempt to initially produce collisions, or superposition of responses, for example by instructing all transponders in a field to respond concurrently. Such may be used simply for estimating or determining the number of transponders in the field. Alternatively, the estimate or determination may optionally be used as part of singulating transponders in the field, for example using standard Gen2 singulation methods but with an initial query or Q value that may be estimate more accurately and quicker than via conventional blind adaptive approaches. These approaches described herein are more efficient than conventional blind adaptive approaches at estimating or determining the query or Q value, and may even accurately estimate the query or Q value in a single query. Thus, instead of discarding collided responses, the approaches described herein derive useful information from the otherwise useless superposition of responses.

While the above described conventional approach to singulation may be successful, it is often time consuming and inefficient. The efficiency of the approach is essentially a function of the initial value selected for the query or Q-value. The closer the value selected as the initial query or Q-value is to the actual number of transponders in the field of the interrogator or reader, the more efficient the singulation. If the value selected for the query or Q-value is too large, a large number of cycles will be required and substantial time lost while transponders decrement their counters, transponders only responding when the value of their respective counters is zero. If the value selected for the query or Q-value is too small, the probability of multiple transponders randomly generating identical first numbers will be relatively large, causing collisions. Such requires transponders to be re-identified. Thus, the time required to perform singulation may be long if the value selected for the query or Q-value is significantly different from the actual number of transponders in the field.

Described herein are approaches to determining the total number of transponders in an interrogation field. Such may be useful on its own. Also described herein are approaches to setting a query or Q value which do not require an a priori knowledge of the actual number or even approximate number of transponders in the field of the interrogator or reader. The terms query value and Q-value are used interchangeably herein and in the claims.

Such approaches may employ the in-phase and quadrature values from responses received from multiple transponders in the field. Such approaches may unexpectedly and advantageously take advantage of the large number of collisions resulting from purposely causing the transponders in the field to concurrently respond. Thus, such successfully using responses from which encoded information cannot be discerned due to the collisions, to set the value of the query or Q value. The approaches even strive to initially produce a large number of collisions by forcing all or substantially all transponders in the field to respond to an initial query or interrogation. Under conventional operation, a reader would typically try to minimize the number of collisions. Under conventional operation, a reader would typically discard collided responses, which the reader could not decode, and may repeat the singulation process.

The approaches described herein may further include, singulating transponders using the determined value for the query or Q value. These approaches may significantly decrease transponder singulation time and thereby significantly increase transponder read rate.

The approaches described herein may have other uses, the determined value of the query or Q value being an indicator of the total number of transponders in a field that respond to an interrogation of inquiry. These approaches may have application in a variety of fields beyond the ADC field.

An interrogator may be summarized as including at least one antenna; a transmitter communicatively coupled to the at least one antenna; a receiver communicatively coupled to the at least one antenna; a controller communicatively coupled with the transmitter and configured to: cause the transmitter to transmit a first query from the interrogator with a query value set to a first value that causes all transponders in a field that receive the first query to respond concurrently; and determine an estimated number N of total transponders in the field based at least in part on a number of baseband demodulated in-phase and quadrature values of any responses to the first query received by the interrogator from the transponders in the field that respond to the first query.

The controller may be further configured to: cause the transmitter to transmit a second query from the interrogator with a query value set to a second value that is based on the estimated number N of transponders in the field that causes the transponders in the field that receive the second query to not all respond concurrently. The controller may cause the transmitter to transmit a first query from the interrogator with a query value set to a first value that is set to zero. The controller may process a plurality of collided responses from the transponders in the field that respond to the first query, from which data encoded in the responses cannot be recovered. The interrogator may further include a demodulator that demodulates responses to the first query received from the transponders in the field before the controller determines the estimated number N of total transponders in the field. The controller may determine a total number M of clusters in the received responses to determine the estimated number N of total transponders in the field based at least in part on the number of baseband demodulated in-phase and quadrature values of the responses to the first query received by the interrogator. The controller may set the estimated number N of total transponders in the field equal to the log base 2 of the total number of clusters M. The controller may be further configured to determine a second value for the query value based on the determined estimated number N of total transponders in the field. The controller may set the second value for the query value to satisfy $2^{Q-1}-1 \leq N \leq 2^{Q}-1$. The controller may be further configured to: cause the transmitter to transmit a second query from the interrogator with a query value set to the second value that causes the transponders in the field that receive the second query to not all respond concurrently; and for each of at least some of the responses to the second query successively received by the receiver from each of a plurality of transponders, cause the transmitter to transmit a signal to cause the respective transponder to temporarily not respond to further interrogation. The interrogator may be configured to interrogate passive or active RFID transponders, and the transmitter and receiver are formed as a transceiver.

A method of operating an interrogator may be summarized as including transmitting a first query from the interrogator with a query value set to a first value that causes all transponders in a field that receive the first query to respond concurrently; receiving by the interrogator responses from the transponders in the field that respond to the first query; and determining an estimated number N of total transponders in the field based at least in part on a number of baseband demodulated in-phase and quadrature values of the responses to the first query received by the interrogator.

The method may further include transmitting a second query from the interrogator with a query value set to a second value that is based on the estimated number N of transponders in the field that causes the transponders in the field that receive the second query to not all respond concurrently. Transmitting a first query from the interrogator with a query value set to a first value that causes all transponders in a field that receive the first query to respond concurrently may include transmitting the first query with the query value set to zero. Receiving by the interrogator responses from the transponders in the field that respond to the first query may include receiving a plurality of collided responses from which data encoded in the responses cannot be recovered. The method may further include demodulating the received responses before determining the estimated number N of total transponders in the field. Determining an estimated number N of total transponders in the field based at least in part on a number of baseband demodulated in-phase and quadrature values of the responses to the first query received by the interrogator may include determining a total number M of clusters in the received responses. Determining an estimated number N of total transponders in the field based at least in part on a number of baseband demodulated in-phase and quadrature values of the responses to the first query received by the interrogator may further include setting N equal to the log base 2 of the total number of clusters M. The method may further include determining a second value for the query value based on the determined estimated number N of total transponders in the field. Determining a second value for the query value based on the determined estimated number N of total transponders in the field may include determining the second value for the query value to satisfy $2^{Q-1}-1 \leq N \leq 2^{Q}-1$. The method may further include transmitting a second query from the interrogator with a query value set to the second value that causes the transponders in the field that receive the second query to not all respond concurrently; successively receiving a response to the second query from each of a plurality of the transponders that received the second query; and for each of at least some of the received responses to the second query, transmitting a signal to cause the respective transponder to temporarily not respond to further interrogation.

BRIEF DESCRIPTION OF THE SEVERAL VIEWS OF THE DRAWINGS

Non-limiting and non-exhaustive embodiments are described with reference to the following drawings, wherein like reference numerals refer to like parts throughout the various views unless otherwise specified. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations associated with transponders, for example RFID transponders or tags, and interrogators or readers, for example RFID readers, computer and/or telecommunications networks, and/or computing systems are not shown or described in detail to avoid obscuring aspects of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Reference throughout this specification and claims to "radio frequency" or RF includes wireless transmission of electromagnetic energy, including, but not limited to, energy with frequencies or wavelengths typically classed as falling in the radio and microwave portions of the electromagnetic spectrum.

The headings provided herein are for convenience only and do not interpret the scope or meaning of the embodiments.

Figure 1:
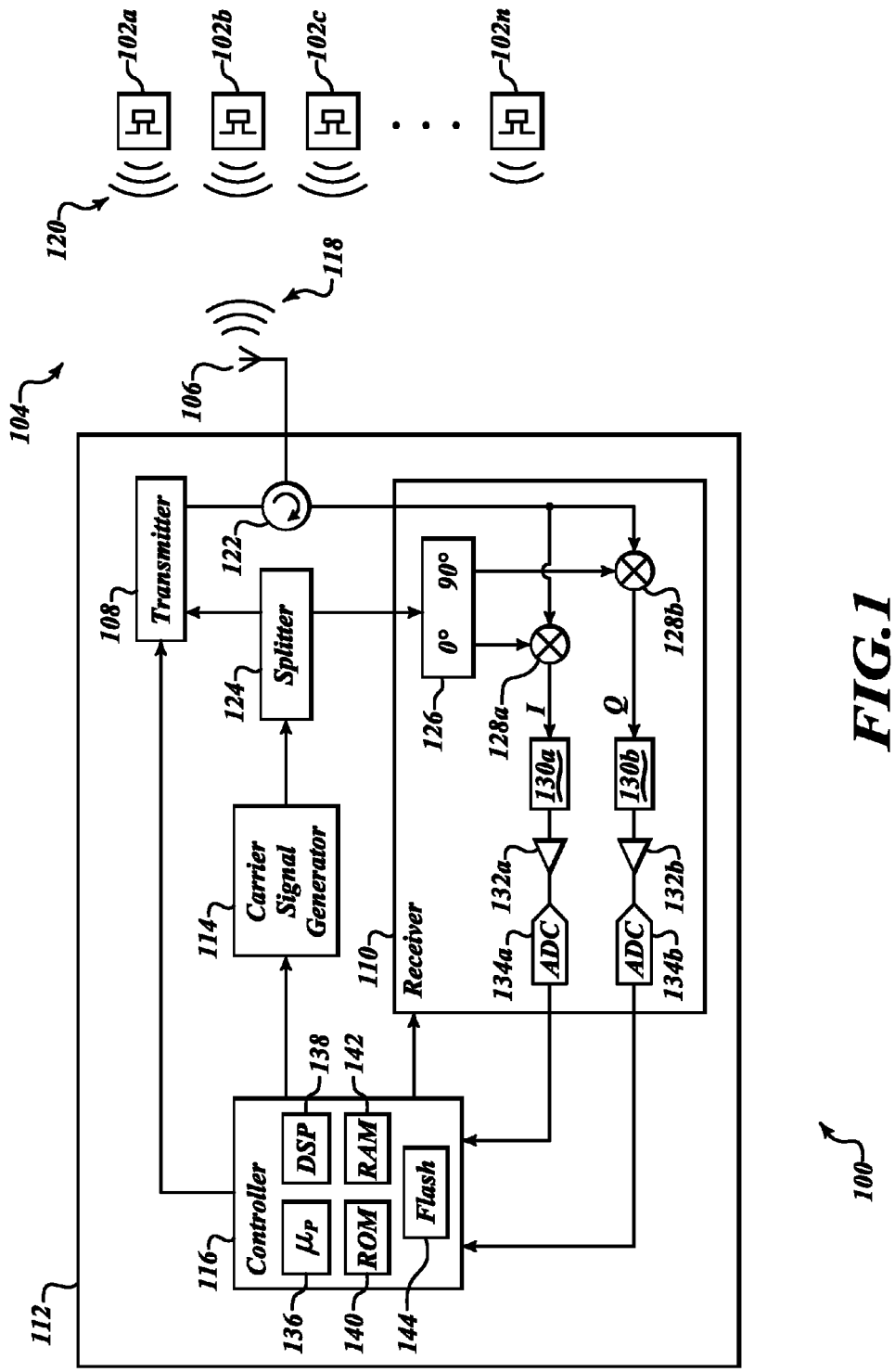
FIG. 1 shows a schematic diagram of an interrogator or reader interrogating a plurality of transponders, according to one illustrated embodiment.

FIG. 1 shows an interrogator or reader 100 having capability to wirelessly read one or more transponders 102a-102n (collectively 102) located within a range or field 104 of the interrogator or reader 100. While only four transponders 102 are illustrated, in typically applications there may be many more transponders 102 in the field 104. The interrogator or reader 100 does not have an a priori knowledge of the numbers of transponders 102 in the field 104.

For simplicity of explanation hereinafter, the interrogator or reader 100 will be described in the context of being an RFID reader that is dedicated to wirelessly reading RFID transponders. The terms reader and interrogator are used interchangeably herein and in the claims to refer to a device or system that is capable of identifying or receiving information from transponders, and/or writing information to transponders. Likewise, the terms range and field are used interchangeably herein and in the claims. The terms interrogation and inquiry are used interchangeably herein and in the claims to refer to a wireless signal transmitted or sent by an interrogator or reader. Similarly, the terms response or return are used interchangeably herein and in the claims to refer to a wireless signal transmitted or sent by a transponder or tag, for instance backscattered thereby. The terms radio frequency or RF are used herein and in the claims in their conventional sense, that is as encompassing that portion of the electromagnetic spectrum typically delineated as radio and microwave portions. Further, the terms signal and signals encompass transmissions which may, or may not, include or encode data or information and/or instructions or commands. For instance, a signal includes a transmission that does not encode data or instructions, but which simply provides power to a passive transponder. Also for instance, a signal includes transmissions that have collided such that information encoded therein can no longer be recovered. Only significant components of the reader 100 are illustrated, and less relevant components are not shown or described in detail in the interest of clarity of presentation.

While described in terms of RFID applications, the reader 100 and transponders 102 can take various other forms. Additionally, the reader 100 may be mobile, may be handle held, or may be a stationary (non-portable) or semi-stationary device (such as attached to a forklift). Even further, the reader 100 can be a multi-mode device having the capability to read other types of data carriers (e.g., machine-readable symbols, touch memories, optical memories, magnetic stripes, etc.) in addition to reading wireless transponders.

The reader 100 includes at least one antenna 106, transmitter 108, receiver 110, a housing 112, carrier signal generator 114 and controller 116. The reader 100 wirelessly sends or transmits one or more RF interrogation or inquiry signals 118 to one or more of the transponders 102, and wirelessly receives one or more RF response or return signals 120 (only one called out in FIG. 1) sent by the RFID transponder(s) 102.

As illustrated, the reader 100 may include a single antenna 106 to both transmit the interrogation signals 118 and to receive the return signals 120. The reader 100 may include a circulator 122 or similar element to communicatively couple the single antenna 106 to the transmitter 108 and receiver 110. Alternatively, the reader 100 may include one or more antennas for transmission and one or more separate antennas for reception. The antenna(s) 106 may be external or internal to the housing 112. For the sake of simplicity of explanation, the reader 100 will be described having the single antenna 106 used for both transmission and reception.

The transmitter 108 and the receiver 110 may each receive a signal generated by one or more carrier signal generators 114, for example via a splitter 124. The carrier signal generator 114 may take a variety of forms. For example, the carrier signal generator 114 may take the form of a voltage controlled oscillator or local oscillator (LO) or similar circuit or structure that generates a signal with a frequency of, or approximate to, a frequency of the carrier wave. The carrier signal generator 114 may generate signals at frequencies suitable for the particular transponders 102 and/or at a variety of frequencies to accommodate various different types of transponders. The splitter 124 or similar circuit or structure splits the signal from the carrier signal generator between the transmitter 108 and receiver 110. Alternatively, the transmitter 108 and receiver 110 may receive signals from respective carrier signal generators or local oscillators, for example where the response signals 120 are on a carrier having a substantially different frequency than the carrier of the interrogation signals 118. As illustrated, the controller 116 may be communicatively coupled to control the carrier signal generator 114.

The transmitter 108 can take any of a variety of forms suitable to wirelessly transmit interrogation signals or inquiries to the transponders 102. The transmitter 108 may transmit at frequencies suitable for the particular transponders 102 and/or at a variety of frequencies to accommodate various transponders.

Likewise, the transmitter 108 may employ any variety of protocols, for example Class 0 or Class 1 Generation 1 protocols, or Class 1 Generation 2 protocol (ISO 18000-6C). The controller 116 may be communicatively coupled to control the operation of the transmitter 108, and/or provide information or data to the transmitter 108 to be encoded into the interrogation signals 118.

The receiver 110 can take a variety of forms suitable to receive wireless response signals from transponders 102. The receiver 110 may be responsive to frequencies suitable for the particular transponders 102 and/or responsive to a variety of frequencies to accommodate various transponders. Likewise, the receiver 110 may be capable of handling any variety of protocols.

In particular, the receiver 110 demodulates the received signal into in-phase and quadrature components. For example, one or more phase shifters 126 (only one illustrated) may receive the signal generated by the carrier signal generator 114, for example via the splitter 124. The phase shifter 126 supplies an in-phase LO signal (i.e., I channel) to a first mixer 128a, and a quadrature LO signal (i.e., Q channel) to a second mixer 128b. The phase shifter 126 may take a variety of forms, for example a parallel combination of two varactors each respectively coupled in series with an inductor. The mixers 128a, 128b can take any of a variety of forms suitable for down conversion of the received RF response signal using a local oscillator (LO) signal. Respective filters 130a, 130b filter the in-phase I and quadrature Q analog baseband outputs of the mixers 128a, 128b. Respective amplifiers 132a, 132b may baseband amplify the filtered in-phase I and quadrature Q signals. Respective analog-to-digital (ADC) converters or slicers 134a, 134b may sample, digitize or otherwise convert the in-phase I and quadrature Q analog baseband outputs of the mixers 128a, 128b into a complex-valued digital representation suitable for processing in the digital domain of the controller 116. While not illustrated, the receiver 118 may also include a comparator and other components for determining which of the in-phase I or quadrature Q components of the received response signal is stronger, and coupling that information to the controller 116.

The controller 116 may take a variety of forms and may include one or more processors, for example one or more microprocessors 136, digital signal processors (DSPs) 138, application specific integrated circuits (ASICs) or programmable gate arrays (PGAs). The controller 116 may also include computer- or processor-readable storage media, for instance read only memory (ROM) 140, random access memory (RAM) 142, flash memory 144, and/or other type of memory. The microprocessors 136, DSPs 138, ASICs, PGAs, ROM 140, RAM 142, and/or Flash memory 144 may be communicatively coupled by one or more buses (not illustrated), for instance one or more power busses, instruction busses, or data busses. The ROM 140, RAM 142, and/or Flash memory 144 may store instructions such as a computer program in the form of software or firmware. The instructions are executable by the microprocessors 136 and/or DSPs 138 to perform the various operations described herein pertaining to singulating transponders 102.

The controller 116 processes the digitized return signals 120 received by the reader 100, as well as to control the operation of various other components (e.g., transmitter) of the reader 100 in response. As explained below, the controller 116 may control the transmission of interrogation signals 118 based at least in part on the received response signals 120 to singulate the transponders 102 in the field 104 in an efficient manner.

While not illustrated, the reader 100 may include a user interface which may include one or more user selectable or operable controls. For example, the reader may include one or more displays (e.g., liquid crystal display (LCD)) upon which elements of a graphical or command line user interface may be presented by the microprocessor 136. Also for example, the user interface may include one or more actuators, for instance one or more triggers, buttons, switches, keys, joystick, thumbstick, trackpad, touch screen, microphone, via which a user may enter instructions, commands, data or information. Also for example, the user interface may include one or more indicators, for instance one or more optical indicators (e.g., light emitting diodes (LEDs, OLEDs)), speakers, and/or mechanical or tactile vibrators.

Also while not illustrated, the reader 100 may include other components 122 to support operation thereof. Such components can include, for example, communication components (e.g., wired port or connector for instance USB ports, radio, cellular, WIFI and/or BLUETOOTH® chipsets) to enable the reader 100 to communicate with an external network/system (such as to download/upload data, information, instructions, commands and/or software or firmware updates). Such components can include, for example, a decryption chipset to decrypt encrypted information decoded from the received return signals 120. Such components can further include, for example, scanning and/or imaging components, for example if the reader 102 is a multi-mode automatic data collection device (e.g., RFID and machine-readable symbol reader).

Also, while not illustrated the reader 100 may include one or more power supplies and/or power sources. Power sources may, for instance, include one or more batteries (e.g., primary or secondary), super- or ultra-capacitor arrays, and/or fuel cells. Power supplies may, for instance, include one or more rectifiers, inverters, DC/DC converters, and/or transformers. Power supplies may also, for instance, include a trickle charger circuit coupled to recharge a secondary battery from an external power source, such as from common AC power (e.g., 120V 60 Hz) via an AC power plug.

Figure 2:
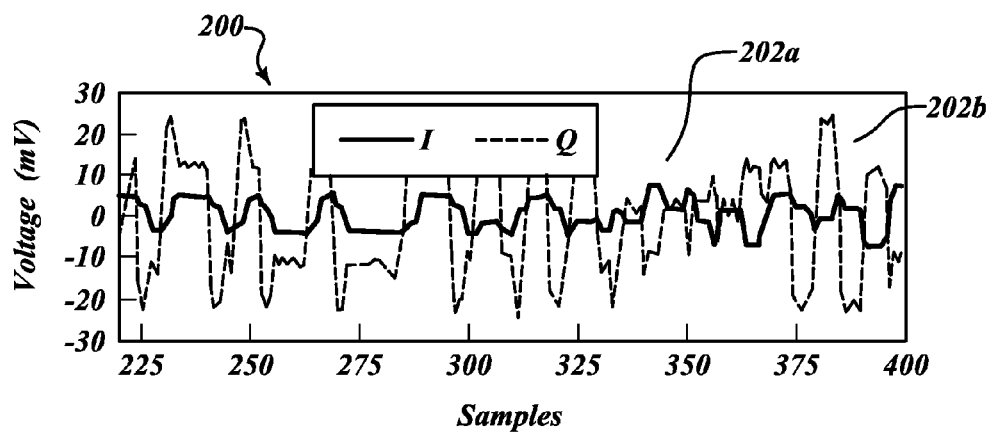
FIG. 2 is a graph of voltage versus samples of responses received from multiple transponders.

FIG. 2 shows a graph 200 representing voltages of the in-phase component 202a and the quadrature component 202b of received signals versus samples of responses received from multiple transponders where significant levels of collision are occurring.

Numerous collisions occur between the responses of the various transponders where the value of the query or Q-value is significantly different from the actual number of transponders present in the field of the reader. As can be discerned from the graph 200, numerous collisions prevent the responses from being effectively decoded. Such prevents the recovery of the transponder identifiers or random numbers which may be encoded in the responses. This hinders or even prevents effective singulation of the transponders.

Figure 3:
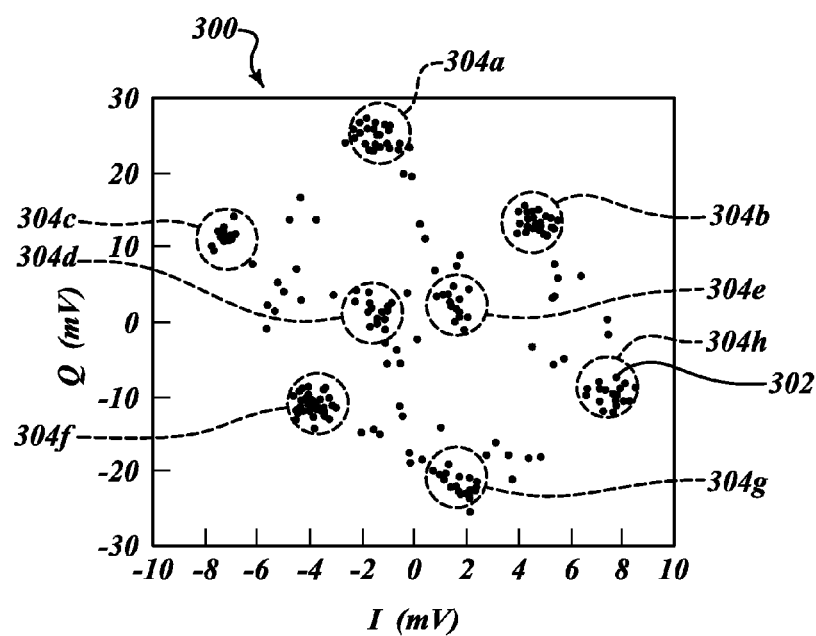
FIG. 3 is a graph of in-phase versus quadrature voltages of responses received from multiple transponders.

FIG. 3 is a graph 300 of voltages of the in-phase component versus the quadrature component of responses (represented by dots 302, only one called out in FIG. 3 for clarity of illustration) received from multiple transponders where significant levels of collision are occurring.

Again, numerous collisions occur between the responses of the various transponders where the value of the query or Q-value is significantly different from the actual number of transponders present in the field of the reader. Such may occur where, for example, the reader does not have an a priori knowledge of the total number of transponders in the interrogation field.

Responses from transponders generally have two states (e.g., HIGH/LOW, ON/OFF), representing respectively a short or an open circuit condition across the antenna. When graphically plotted, such generally appears as a generally dumbbell shape. Small movements of the transponder relative to the reader, tend to create small changes in the plot. Applicants have recognized that responses from a given transponder, even collided responses, tend to cluster together. Applicants have further recognized that the number of transponders in a field may be determined or at least approximated or estimated by determining the number of clusters formed by the down converted in-phase I and quadrature Q components of received response signals. In particular, since each transponder has two states the number of clusters M is related to the number of transponders by the relationship $M=2^N$. Such is represented graphically in FIG. 3 by circles 304a-304h (collectively 304) representing the clusters, which encompass various responses 302.

Thus, received signals 302 may be plotted on an IQ plane (or density histogram), including received signals which have collided and from which encoded information may not be recovered. The number of M clusters may be counted using a portion of the time domain multiple transponder responses which contain random numbers. Since each moment in time, N response signals are colliding, and because each signal can have two different states or voltage levels, the total number of possible combinations, and hence the total number of clusters or peaks in the IQ-plane is give by $2^N$.

The illustration represents a simplified example where there are eight (i.e., M=8) clusters 304a-304h of responses 302 and hence only three transponders (i.e., $M=2^N$). In many applications the total number of transponders, and hence total number of clusters 304 may be much larger. As is clear from the illustration, not all responses necessarily will fall into a cluster 304. Such should not significantly adversely affect the determination or estimation of the value to be used as the query value.

While it is possible to graphically represent or plot the in-phase I and quadrature Q components of the down converted received responses, such may not be efficient or even effective for a controller using a microprocessor or digital signal processor. However, a number of algorithms exist which may allow a microprocessor or digital signal processor to effectively perform such cluster analysis. Such are discussed below in reference to the operation of the reader, represented in the flow diagrams of FIGS. 4 and 5.

Figure 4:
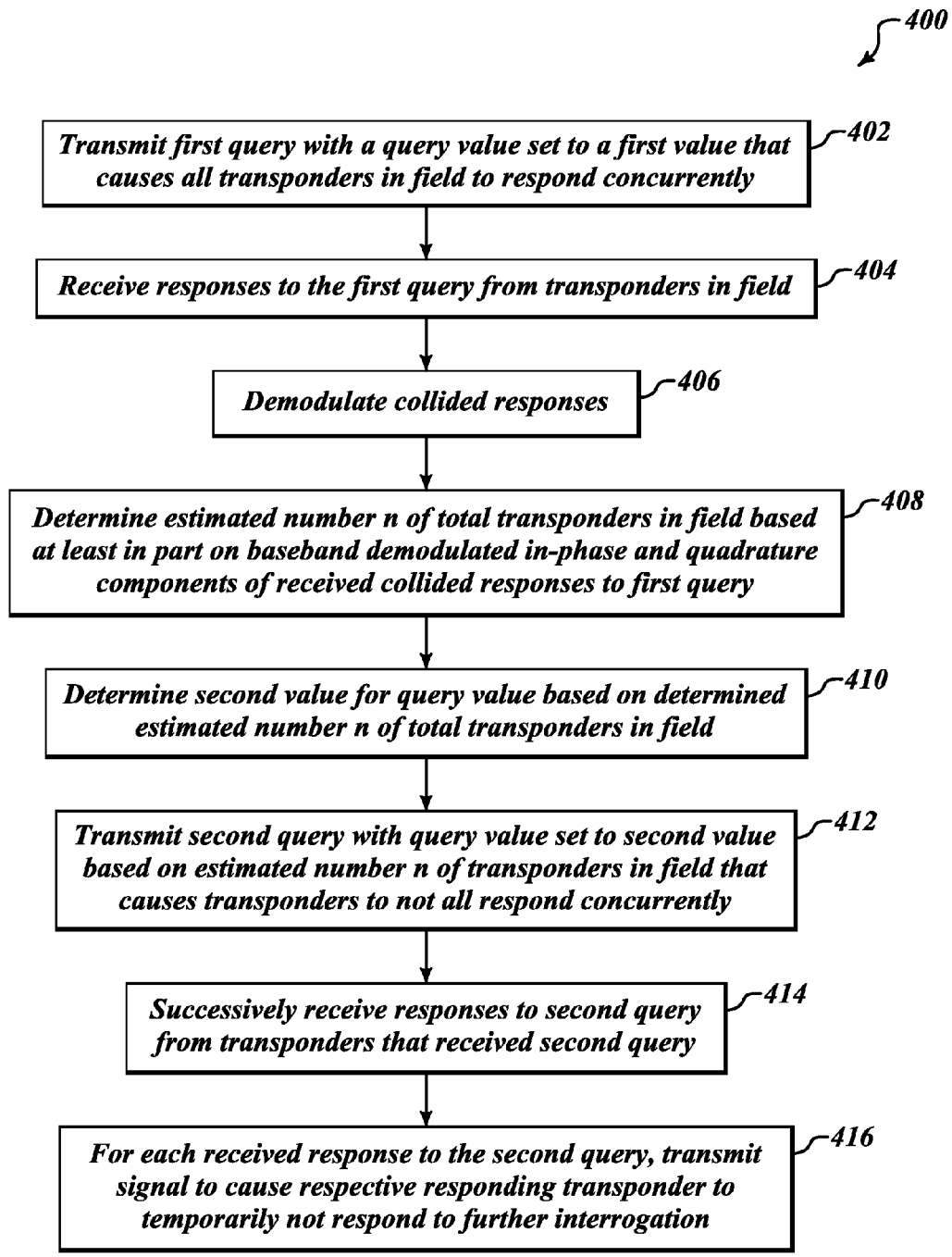
FIG. 4 is a high level flow diagram showing a method of operating an interrogator or reader, according to one illustrated embodiment.

FIG. 4 shows a method 400 of operating a reader, according to one illustrated embodiment.

As an overview of the method 400, the reader first transmits and interrogation or inquiry signal with a value that causes all transponders in the field to respond. The reader then determines or estimates the total number of transponders in the field. Where singulation is to be performed, the reader may then set the initial value of the query or Q-value for singulation. The reader may set the initial value of the query or Q-value more accurately than is done under the conventional blind adaptive approaches typically employed. The reader may then singulate the transponders, and optionally read and/or write to the singulated transponders.

At 402, the reader transmits a first query with a query value set to a first value that causes all transponders in a field to respond concurrently. In particular, the controller may cause the transmitter to transmit an interrogation signal via one or more antennas, the interrogation signal encoding a value, for instance the value 0, or some other value dependent on the specific protocol being employed. The term concurrently as used herein and in the claims means substantially at the same time or within the same interrogation cycle.

At 404, the reader receives collided responses to the first query from transponders in field that respond to the first query. In particular, the reader may receive responses at the receiver via one or more antennas. In theory, all transponders within the field or range of the reader should respond. However, in practical applications it may be possible that one or more transponders within the field or range fail to respond to the query, for example due to some interference (e.g., multipath).

At 406, the reader demodulates the received collided responses. In particular, the receiver may down convert the received collided responses into in-phase and quadrature components. Thus, rather than demodulating isolated transponder responses, the reader demodulates a superposition of all transponder responses which are incident on the antenna of the reader. In contrast, conventional readers read or decode signal responses at a time. The reader discards the response if unable to decode, for example if the response of two or more transponders have collided. The receiver may also filter, amplify or otherwise process the responses. The receiver may further convert the analog responses to digital form, suitable for further processing by the controller.

At 408, the reader determines an estimated or approximate number N of total transponders in field based at least in part on baseband demodulated in-phase and quadrature components or signals of any collided responses to the first query received from transponders in the field that respond to the first query. In particular, the controller may process the digitized representations of the in-phase and quadrature components of the received collided responses, for example to identify clusters. The controller may execute any of a variety of algorithms for the field of statistical data analysis and/or signal processing to accomplish such, using suitable threshold values. For example, the controller may execute algorithms identical or similar to those describe in Swami, Ananthram, Salder, Brian, *Modulation Classification Via Hierarchical Agglomerative Cluster Analysis*, IEEE publication 0-7803-3944-4/97 or Schreyogg, Christopher, *Identification of Voiceband Data Signal Constellations Using A Divisive Cluster Algorithm*, IEEE publication 0-7803-3629-1/96. The controller may employ other suitable histogram, hierarchical, partitional, and/or spectral clustering algorithms. For example, an area of an IQ plane may be divided into a number of uniform unit areas, and the number of responses appearing in each area determined. Again, the total number of peaks M in the IQ-plane is related to the total number of transponders by the relationship $M=2^N$.

The method 400 may terminate, having successfully estimated or determined the total number of transponders in the field. Optionally, the method 400 may perform singulation, using the estimated total number of transponders to set the query of Q value, as described with reference to acts 410-416, immediately below.

At 410, the reader determines a second value for the query value based on the determined estimated number N of total transponders in field. In particular, the controller may set the second value. The reader may, for example, execute the algorithm set out in FIG. 5, discussed below to determine the second value for the query or Q value.

At 412, the reader transmits a second query with query value set to second value based on estimated number N of transponders in field, which second value that causes transponders to not all respond concurrently. In particular, the controller may cause the transmitter to transmit an interrogation signal via the at least one antenna, which interrogation signal encodes the query value. This may be identical or similar to conventional Q algorithm approaches to singulation, but advantageously uses a more accurate value for the query or Q-value.

At 414, the reader successively receives responses to second query from transponders that received second query. In particular, the receiver may successively receive responses via one or more antennas and process the responses. Notably, by accurately setting the query or Q-value of the second query, there should be significantly less collisions. Thus, the reader should be able to decode many of the received responses, for example determining a unique identifier or second number for each transponder from which a response is received.

At 416, for each of at least some of the received responses to the second query, the reader transmits a signal to cause respective responding transponder to temporarily not respond (i.e., nap) to further interrogation. In particular, the controller may cause the transmitter to transmit an interrogation signal via at least one antenna, encoding a unique identifier which uniquely identifies a current or respective one of the responding transponders, along with an instruction to enter a nap or sleep mode. On receipt, the identified transponder determines if the instruction corresponds to itself, and if so, executes the instruction. Such effectively prevents the transponder from sending further responses for some period of time, eliminating or reducing the likelihood of collisions.

Figure 5:
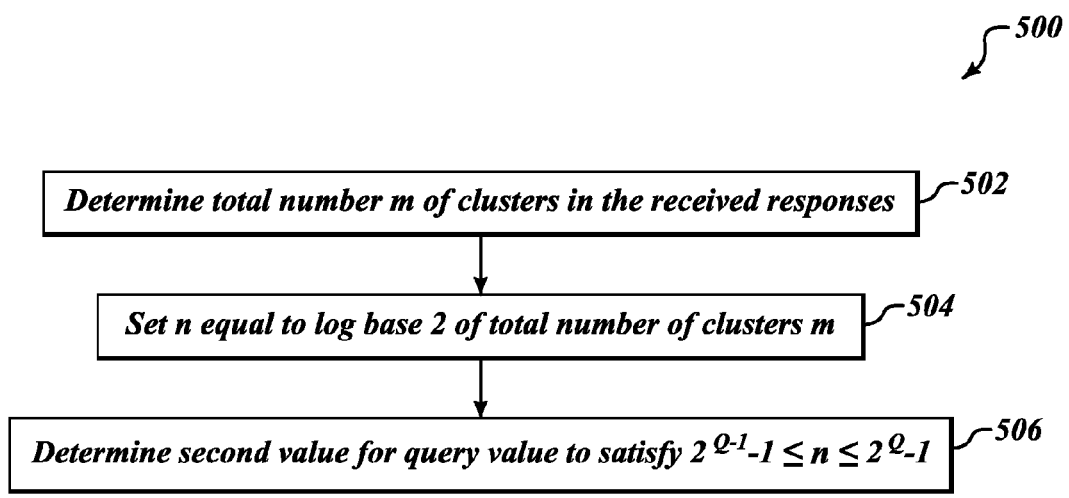
FIG. 5 is a low level flow diagram of a method of operating an interrogator or reader, according to one illustrated embodiment.

FIG. 5 shows a method 500 of operating a reader, according to one illustrated embodiment. The method 500 may, for example, be useful in determining the total number of transponders 408 (FIG. 4) and setting the query or Q-value of the second query 410 of the method 400 (FIG. 4).

At 502, the reader determines a total number M of clusters in the received responses. As explained above, the controller may execute any number of suitable algorithms to identify the clusters and/or determine the total number of clusters.

At 504, the reader may set N equal to log base 2 (i.e., $N=\log_2(M)$) of total number of clusters M. In particular, the controller may perform the calculation using the value M determined at 502.

At 506, the reader determines a second value for the query value to satisfy $2^{Q-1}-1 \leq N \leq 2^Q-1$. In particular, the controller may calculate the second value for the query or Q-value using the value N determined at 504. The reader may then encode the query or Q-value into the interrogation signal.

The various embodiments described above can be combined to provide further embodiments. Aspects of the embodiments can be modified, to provide yet further embodiments.

The teachings herein can be applied to: 1) determine or estimate a total number of transponders in a field; 2) singulate transponders in a field; 3) read information from and/or write information to transponders in a field. The teachings herein are applicable to a wide array of transponders, not only to the exemplary RFID transponders described above.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An interrogator, comprising:
   at least one antenna;
   a transmitter communicatively coupled to the at least one antenna;
   a receiver communicatively coupled to the at least one antenna;
   a controller communicatively coupled with the transmitter and configured to:
   cause the transmitter to transmit a first query from the interrogator with a query value set to a first value that causes all transponders in a field that receive the first query to respond concurrently; and
   determine an estimated number N of total transponders in the field based at least in part on baseband demodulated in-phase and quadrature components of a plurality of collided responses to the first query received by the interrogator from the transponders in the field that respond to the first query.

2. The interrogator of claim 1 wherein the controller is further configured to:
   cause the transmitter to transmit a second query from the interrogator with a query value set to a second value that is based on the estimated number N of transponders in the field that causes the transponders in the field that receive the second query to not all respond concurrently.

3. The interrogator of claim 1 wherein the controller causes the transmitter to transmit a first query from the interrogator with a query value set to a first value that is set to zero.

4. The interrogator of claim 1 wherein the controller processes the plurality of collided responses from the transponders in the field that respond to the first query, from which data encoded in the responses cannot be recovered.

5. The interrogator of claim 1, further comprising:
a demodulator that demodulates the plurality of collided responses to the first query received from the transponders in the field before the controller determines the estimated number N of total transponders in the field.

6. The interrogator of claim 5 wherein the controller determines a total number M of clusters in the received responses to determine the estimated number N of total transponders in the field based at least in part on the baseband demodulated in-phase and quadrature components of the plurality of collided responses to the first query received by the interrogator.

7. The interrogator of claim 5 wherein the controller sets the estimated number N of total transponders in the field equal to the log base 2 of the total number of clusters M.

8. The interrogator of claim 7 wherein the controller is further configured to determine a second value for the query value based on the determined estimated number N of total transponders in the field.

9. The interrogator of claim 8 wherein the controller sets the second value for the query value to satisfy $2^{Q-1}-1 \leq N \leq 2^Q-1$.

10. The interrogator of claim 9 wherein the controller is further configured to:
cause the transmitter to transmit a second query from the interrogator with a query value set to the second value that causes the transponders in the field that receive the second query to not all respond concurrently; and
for each of at least some of the responses to the second query successively received by the receiver from each of a plurality of transponders, cause the transmitter to transmit a signal to cause the respective transponder to temporarily not respond to further interrogation.

11. The interrogator of claim 9 wherein the interrogator is configured to interrogate passive or active radio frequency identification (RFID) transponders, and the transmitter and receiver are formed as a transceiver.

12. A method of operating an interrogator, comprising:
transmitting a first query from the interrogator with a query value set to a first value that causes all transponders in a field that receive the first query to respond concurrently;
receiving by the interrogator a plurality of collided responses from the transponders in the field that respond to the first query; and
determining an estimated number N of total transponders in the field based at least in part on baseband demodulated in-phase and quadrature components of the collided responses to the first query received by the interrogator.

13. The method of claim 12, further comprising:
transmitting a second query from the interrogator with a query value set to a second value that is based on the estimated number N of transponders in the field that causes the transponders in the field that receive the second query to not all respond concurrently.

14. The method of claim 12 wherein transmitting a first query from the interrogator with a query value set to a first value that causes all transponders in a field that receive the first query to respond concurrently includes transmitting the first query with the query value set to zero.

15. The method of claim 12 wherein receiving by the interrogator responses from the transponders in the field that respond to the first query includes receiving the plurality of collided responses from which data encoded in the responses cannot be recovered.

16. The method of claim 12, further comprising:
demodulating the received plurality of collided responses before determining the estimated number N of total transponders in the field.

17. The method of claim 12 wherein determining an estimated number N of total transponders in the field based at least in part on baseband demodulated in-phase and quadrature components of the plurality of collided responses to the first query received by the interrogator includes determining a total number M of clusters in the received responses.

18. The method of claim 17 wherein determining an estimated number N of total transponders in the field based at least in part on baseband demodulated in-phase and quadrature components of the plurality of collided responses to the first query received by the interrogator further includes setting N equal to the log base 2 of the total number of clusters M.

19. The method of claim 18, further comprising:
determining a second value for the query value based on the determined estimated number N of total transponders in the field.

20. The method of claim 19 wherein determining a second value for the query value based on the determined estimated number N of total transponders in the field includes determining the second value for the query value to satisfy $2^{Q-1}-1 \leq N \leq 2^Q-1$.

21. The method of claim 20, further comprising:
transmitting a second query from the interrogator with a query value set to the second value that causes the transponders in the field that receive the second query to not all respond concurrently;
successively receiving a response to the second query from each of a plurality of the transponders that received the second query; and
for each of at least some of the received responses to the second query, transmitting a signal to cause the respective transponder to temporarily not respond to further interrogation.

* * * * *